July 26, 1927.

A. Y. DODGE 1,636,903

BRAKE CONTROL LUBRICATING MEANS

Filed April 9, 1924

INVENTOR
ADIEL Y. DODGE
BY
A. D. T. Libby
ATTORNEY

Patented July 26, 1927.

1,636,903

UNITED STATES PATENT OFFICE.

ADIEL Y. DODGE, OF SOUTH BEND, INDIANA, ASSIGNOR, BY MESNE ASSIGNMENTS, TO BENDIX BRAKE COMPANY, OF CHICAGO, ILLINOIS, A CORPORATION OF ILLINOIS.

BRAKE-CONTROL-LUBRICATING MEANS.

Application filed April 9, 1924. Serial No. 705,192.

This invention relates to means for lubricating the control mechanism used particularly in connection with automotive vehicles and as disclosed, the lubricating means is applied to the control shaft used in actuating brakes on the front wheels of the vehicle. In control mechanisms for front wheel brakes, it has been customary to apply grease or oil cups external to the parts to be lubricated and then rely on these various cups being filled with lubricant.

It is the principal object of my invention to make use of the brake control shaft as a medium to conduct lubricant from a source of supply on the chassis to whatsoever parts desired pertaining to the front wheels and steering knuckles, including the universal joint, brake cam and other brake parts.

It is a further object to eliminate a number of grease or oil cups, thereby simplifying and cheapening the lubricating arrangement, and at the same time to obtain a better system of lubrication.

In my application Serial No. 695,566, filed February 27, 1924, I have disclosed a ball joint used in connection with a front wheel control mechanism and I have chosen to show the application of my present invention to such a construction.

Figure 1:
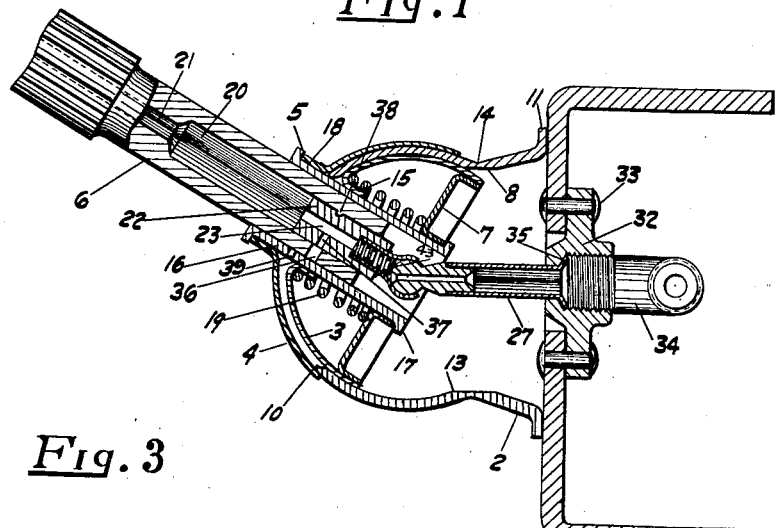

Therefore, Figure 1 of the drawing shows an elevation in section of my said ball joint with the lubricating means applied thereto.

Figure 3:
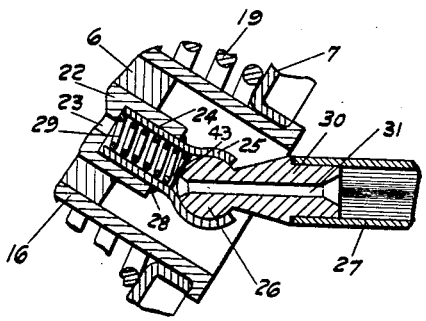
Figure 2:
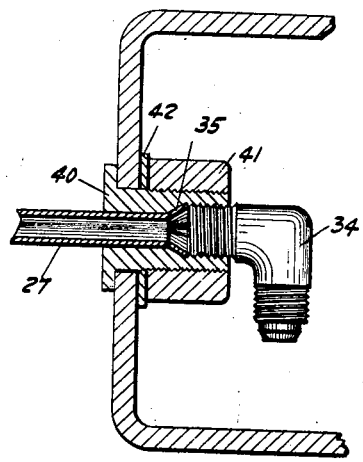

Figure 2 is a modified form of the support and of the lubricating feeding means; while Figure 3 is an enlarged view of certain of the details entering into the construction.

In order to make my present invention clearly understood, reference is made to the parts illustrated in my previously referred to application by the same numbers, wherein 1 is a channel member of the chassis frame to which the body part 2 of the joint is adapted to be fastened through a flange 11. The body 2 has its greater portion formed spherically, the spherical part on the inside being extended to the point 13, giving about 225 degrees of movement on the inside and a few degrees more on the outer surface of the sphere, which is preferably relieved at the point 14 so that the cap 4 in its oscillating movement will not rub the finish off at this point, it being practice to plate or japan the exposed parts of these members. In addition after the body member 2 has been formed, a cylindrical hole 8 is bored at the point indicated to provide a passage for the cup or hemispherically shaped member 3, the rim of which is preferably slit in two or more places so that the rim can be forced inwardly toward its center in passing the member 3 through the circular opening 8. The cup 3 has its bottom turned inwardly, forming a tubular seat 15, which is adapted to slidably fit the sleeve 16. On the inner end of the sleeve 16 is mounted a member 7 constituting a diaphragm, it being understood that the spring 19 is put in position before the diaphragm 7 is placed on the sleeve and the metal of the sleeve spun over at 17. On the outer end of the sleeve 16 is mounted a cap 4. whose central part is formed into an annular seat 18 and cap 4 is prevented from coming off the sleeve by spinning over the metal of the sleeve as indicated at 5. It is thus seen that the sleeve 16 is positioned in an opening in the spherical part of the body 2, the beginning of which opening is indicated at 10. The cap 4 closes the opening from the outside, while the cup 3 covers the opening from the inside, the cap and cup being held in operative position to the outer and inner surfaces with respect to the spherical part of the body 2 by the spring 19. The function of all of these parts will not be further described herein, but rather the means for lubricating them as well as the universal joint which is associated with the wheel end of the control shaft 6. This universal joint is not shown, as it may take any desired form, for example such as illustrated in my application Serial No. 697,472, filed March 7, 1924; also the operating lever is not shown but this is adapted to be fastened to the control shaft 6 in any suitable manner.

In order to lubricate the ball joint just described, as well as the universal joint connected to the other end of the control shaft, including other parts of the associated brake actuating mechanism together with lubricant connecting means from the universal joint parts to the axle pivot pin, I have provided a hollow control shaft preferably having a bore 20 in the ball joint end and a smaller bore 21 extending all the way through the shaft. In the bore 20 is provided a slidable member 22 which itself is hollow or preferably provided with two bores, one 23 acting as a passage for lubricant and the other of somewhat larger diameter in which is positioned the shank 24 of a socket member, the socket being illustrated at 25 and formed to receive the ball 26 of a hollow member 27. The shank 24 is rigidly fastened to the member 22 in any suitable manner as by brazing or welding at 28. A spring 29 is positioned in the hollow part of the shank 24, one end resting against a cupped washer 43 resting against ball 26, and thus serves to set up a tension which will cause the socket 25 to continually engage the surface of the ball 26, thereby maintaining approximately an oil tight joint at this place and to prevent rattle of these parts. As shown, the ball 26 is attached to a shank portion 30 securely fitted to the hollow member 27 and has a metering oil passage 31 therethrough. The member 27 is held in the mounting plate 32 which is fastened to the side of the chassis frame in any suitable manner, as by rivets 33. An oil fitting 34 is adapted to be screwed into the mounting plate 32 and assists in gripping the end of the member 27 at the flange 35, providing an oil tight joint at this point. The member 34 may be connected to any suitable oil reservoir or pump, and as will be readily seen, lubricant is passed through the member 27, passageway 31, the hollow shank 24, into the bore or passageway 23 and so on through the hollow shaft 6 to the parts of the universal joint. The sleeve 16 in the ball joint is lubricated through the medium of a cross hole 36 in the shaft 6, which in at least one position of the control shaft 6 registers with the cross hole 37 in the slidable member 22 which is also provided with an annular groove 38 to lubricate the movement of the slidable member 22 in the bore 20. The sleeve 16 may be provided with a hole 39 through which lubricant will pass between the cup 3 and the cap 4, whereby lubricant is furnished between these parts and the spherical part of the member 2.

In Figure 2 a modified form of holding the hollow member 27 is shown in which a clamping bushing 40 and clamping nut 41 with a gasket 42 serves to hold the members 34 and 27 in position. By using this construction only one hole is required to be put through the side of the chassis member.

From what has been said, it will be clear that the details of the construction entering into my invention may be varied considerably without departing from the spirit of my invention and the scope of the appended claims.

Having thus described my invention, what I claim is:

1. In mechanism, including a control shaft having a support comprising a ball joint having a sleeve member in which one end of said shaft is positioned, said shaft being formed with a bore, means for lubricating said mechanism consisting of a member slidably positioned in said bore and terminating in a socket, said member and socket having a passageway therethrough, a hollow ball ended member fitting in said socket, a support for said ball ended member and a lubricant fitting communicating with said hollow ball ended member for the purpose described.

2. In mechanism, including a control shaft having a support comprising a ball joint having a sleeve member in which one end of said shaft is positioned, said shaft being formed with a bore, means for lubricating said mechanism consisting of a member slidably positioned in said bore, said slidable member having a bore in one end and a passageway leading therefrom through the member, a socket member having its shank set in the bore of the slidable member, a member having a ball fitting in said socket, said member having a passage therethrough, a spring housed within said shank and pressing against the end of the ball, a support for said ball ended member, and a lubricant fitting communicating with said passageway in the ball ended member for the purpose described.

3. In mechanism, including a control shaft having a support comprising a ball joint having a sleeve member in which one end of said shaft is positioned, said shaft being formed with a larger bore in the sleeve end and a smaller bore extending from the larger bore through the remainder of said shaft, said shaft having a cross hole leading from the larger bore to the sleeve, a slidable member in the larger bore, said slidable member having a larger bore in one end and a smaller bore extending from the larger bore through the remainder of said slidable member, said slidable member having a cross hole from its smaller bore so positioned that it will register with the cross hole in said shaft end under certain conditions of operation, a socket member having its shank set in the bore of the slidable member, a member having a ball fitting in said socket, said member having a passage therethrough, a spring housed within said shank and pressing against the end of the ball, a support for said ball ended member, and a lubricant fitting communicating with said passageway in the ball ended member for the purpose described.

4. In mechanism, including a control shaft having a support comprising a ball joint having a sleeve member in which one end of said shaft is positioned, said shaft being formed with a bore, means for lubricating said mechanism consisting of a hollow member slidably positioned in said shaft bore, a socket member having a hollow shank carried by said slidable member, a hollow member having a ball shaped end fitting in said socket member, a spring within the shank of the socket member acting to make the socket grip the ball shaped end, a support for said ball ended member, a lubricant fitting communicating with said hollow ball ended member, said shaft and slidable member having cross lubricating passages as and for the purpose described.

5. In mechanism, including a control shaft having a support comprising a ball joint having a sleeve member in which one end of said shaft is positioned, means for lubricating said mechanism consisting of; a hollow member slidably mounted in the end of said shaft, said shaft having a bore throughout its length, a member having a socket fastened to the end of said slidable member, a hollow member having a ball to fit said socket, a support for said last mentioned member, and means for passing lubricant thereto.

6. In mechanism, including a control shaft having a support comprising a ball joint having a sleeve member in which one end of said shaft is positioned, means for lubricating said mechanism consisting of; an auxiliary ball and socket joint housed within said shaft sleeve, one part of the joint being slidably carried in the end of the shaft, said shaft having a bore throughout its length, the other part of the joint having a relatively fixed support, the parts of said joint having oil passages therethrough communicating with the bore in said shaft as well as cross passages to convey oil to the sleeve and other parts of the main ball joint and auxiliary joint, and means for passing lubricant to said passages.

7. Means for lubricating the mechanism employed in vehicle front wheel brake controls, comprising a brake control shaft having one end universally supported on the chassis, said control shaft having a passage therethrough, and a fixed lubricant-supplying member adapted to be coupled to the chassis end thereof at the center of the universal movement of the shaft and in communication with said passage.

8. Means for lubricating the mechanism employed in vehicle front wheel brake controls, comprising a hollow brake control shaft having one end universally supported on a non-rotating part of the vehicle, and means for passing lubricant to and through said hollow control shaft for the purposes described including a pair of lubricant conduits universally jointed for movement about the center of the universal movement of the shaft.

9. In vehicle front wheel brake control mechanisms, means for lubricating the same, comprising; a control shaft having an oil passage substantially throughout its length extending from adjacent the wheel to a universal chassis support, and a fixed lubricant-supplying member adapted to be connected with said passage within said universal support and substantially at its center of universal movement for the purposes described.

10. Means for lubricating the steering pivot pin, brake actuating cam and universal joint mechanisms included in vehicle front wheel brake controls, comprising a brake control shaft having a lubricant passage substantially throughout its length extending to a chassis support, a lubricant-supplying member fixedly mounted on the chassis and adapted to be connected with said passage, and further means cooperating with said passage to lead some of the oil to certain of the parts of said chassis support as described.

11. Brake-operating mechanism comprising, in combination, a chassis frame, a brake-applying shaft having its inner end adjacent said frame, a support for the inner end of the shaft carried by said frame and including a joint permitting universal and axial movement of the shaft, a lubricant fitting fixedly mounted on the frame, and means for conveying lubricant from the fitting to said joint substantially unaffected by movement of the shaft.

12. Brake-operating mechanism comprising, in combination, a chassis frame, a brake-applying shaft having its inner end adjacent said frame, a fixed support carried by said frame, a movable support carrying the inner end of the shaft and mounted on the fixed support and permitting universal and axial movement of the shaft, a lubricant fitting fixedly mounted on the frame, and means for conveying lubricant from the fitting to the shaft.

In testimony whereof, I affix my signature.

ADIEL Y. DODGE.